INVENTORS:
ROLAND WEISBECK, ANDREAS BROCKES.
BY

ATTORNEY

United States Patent Office 3,309,226
Patented Mar. 14, 1967

3,309,226
PHOTORESISTORS AND PHOTOELEMENTS HAVING INCREASED SENSITIVITY IN THE SHORT-WAVE REGION OF THE SPECTRUM
Roland Weisbeck, Cologne-Poll, and Andreas Brockes, Cologne-Mulheim, Germany, assignors to Farbenfabriken Bayer Aktiengesellschaft, Leverkusen, Germany, a corporation of Germany
Filed Nov. 10, 1964, Ser. No. 410,127
Claims priority, application Germany, Nov. 22, 1963, F 41,334
6 Claims. (Cl. 117—201)

This invention relates to photoresistors and photoelements having a higher sensitivity in the short-wave region of the spectrum compared with the characteristic spectral sensitivity distribution of the photo-semiconductor material used.

It is known that the spectral sensitivity is determined by the absorption properties of the semiconductor material concerned. An increase in sensitivity in the long wave tail region of the characteristic spectral sensitivity distribution is in many cases easily possible, for example by doping, deviations from the stoichiometry in compound semiconductors, intrinsic defects and sensitization. Apart from some sensitizations, this increase in sensitivity in the long wave region is always obtained at the cost of sensitivity at the end of the fundamental absorption band. In all cases the sensitivity to still shorter waves is then considerably reduced.

However, in many cases it is of great interest to increase the region of spectral sensitivity of a given semiconductor material towards the region of shorter wavelengths.

Many photo-semiconductors used in the visible region of the spectrum, which have good properties as regards their overall sensitivity, have reduced sensitivity in the blue region of the spectrum. For many problems occurring in practice in which visible daylight or artificial indoor lighting is to be transformed into electrical signals or energy, a high overall sensitivity of the photo-semiconductor is essential but the photo-semiconductor must be such that it will also respond well to blue light or utilize it as efficiently as possible. This requirement is of great importance, for example, in the use of the cadmium sulfide photoresistor as optical electronic control device in cine-cameras and in the use of the cadmium sulfide photoelement as optical electronic control device in automatic cameras or as sunlight battery for the production of electrical energy from light energy. The same applies especially to the use of cadmium selenide as photoresistor and silicon as photoelement or sunlight battery in the visible region of the spectrum. In cadmium telluride and selenium and other photo-semiconductors, increased sensitivity to blue with practically unchanged sensitivity in the remaining region of the spectrum is also very desirable.

It has been known for a long time that wavelength transformation from short to longer waves can be effected by means of fluorescent substances.

Further, it is known according to German patent specification 868,481 that photoresistors made of cadmium sulfide can be made sensitive to invisible ultraviolet control radiation although the fundamental absorption edge of cadmium sulfide lies in the green region of the spectrum and the sensitivity in the UV region is practically non-existent. This is achieved by mixing finely crystalline cadmium sulfide powder with a luminescent substance, especially zinc silicate powder. The luminescent substance absorbs the ultraviolet light and emits a fluorescent light of longer wavelength which is taken up by the cadmium sulfide photoresistor in the region of high spectral sensitivity. In the cited work, a filter is usually employed which absorbs the visible radiation and transmits only the invisible ultraviolet control radiation. The spectral sensitivity of cadmium sulfide is, however, reduced by mixing it with a powdered luminescent substance in the region of longer wavelengths because the luminescent substance causes scattering of light and hence losses due to scattering. The fluorescent light also suffers scattering losses; in addition, it is partly absorbed in the grains of luminescent material owing to concentration extinction or self extinction. In the above mentioned patent specification it is also proposed to use luminescent solutions or emulsions which surround the photo-semiconductor either in the liquid form or distributed in a solid binder. However, with the means hitherto known the sensitivity of photoresistors and photoelements in the shortwave region of the spectrum cannot be increased while at the same time maintaining the sensitivity in the other regions of the spectrum, with the consequence that it has not so far been possible to produce highly efficient photoresistors and photoelements which are highly sensitive over a wide region of the spectrum and which satisfy present-day technical requirements.

The invention will be further described with reference to the drawings in which

Figure 1:
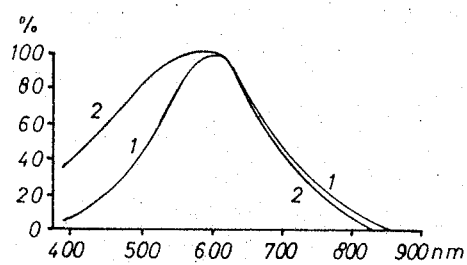
FIG. 1 is a graph showing the relative spectral photocurrent of a photoresistor in accordance with the invention.

The present invention relates to photoresistors and photoelements of increased sensitivity in the shortwave region, in which the photo-semiconductor material is in optical contact with a binder which contains a fluorescent dyestuff, characterized in that the photo-semiconductor carries one or more layers of one or more transparent binders which contain, in homogeneous distribution, one or more of the following fluorescent substances namely: sodium salicylate, 1-p-sulfonamido-phenyl-3-p-Cl-phenyl-pyrazoline, 3 - [2″ - Cl - 4″ - diethylamino - triazinyl-(6″) - aminophenyl] - coumarin, 3 - phenyl - 7 - [2′-Cl-4′-diethylamino-triazinyl-(6′)]-7-coumarin, the condensation product of 1 mol terephthalaldehyde+2 mols ethyl cyanoacetate, 4-amino-1:8-naphthal-p-xenylimide, 1-phenyl-3-styrylpyrazoline, 2:2′-dihydroxy-α-naphthaldazine, 2:2′-dioxy-benzaldazine-salicyladazine, ethyl esters of meta - monoethylaminophenylphthalein - hydrochloride, anthrapyrimidine and the condensation products of 1 mol of perylenetetracarboxylic acid+2 mols 4:5-dichloro-o-toluidine and/or meta-diethylaminophenolphthalein hydrochloride in concentrations between 0.01 and 2% by weight calculated on the binder used in each case.

A special advantage of the process according to the invention is that optimum increase in the blue sensitivity of a given semiconductor can be obtained by choice of one of the above mentioned fluorescent dyestuffs or by a suitable combination of several such fluorescent dyestuffs with practically no impairment of the sensitivity in the rest of the spectrum.

In addition to the above mentioned fluorescent dyestuffs, other fluorescent substances are also suitable for the new process provided they absorb light mainly at the short-wave end of the fundamental absorption edge of the photo-semiconductor materials used and emit in the region of maximum spectral sensitivity of these materials. In the case of some photo-semiconductors, for example, the fluorescent derivatives of violanthrene can be used with good success.

It has been found that especially good utilization of fluorescent light is ensured by using a very thin transparent layer of binder which is mounted directly on the photo-semiconductor material, and in which the fluorescent dyestuff is distributed homogeneously if possible as a molecular dispersion.

Although a considerable increase in the blue sensitivity of the photo-semiconductor is already obtained by choosing from the above list a fluorescent dyestuff which is particularly suitable for the given photo-semiconductor material, it is found that in many cases an additional increase in the blue sensitivity can be obtained by incorporating a second or several of the above mentioned fluorescent dyestuffs which have slightly different absorption properties from the first fluorescent dyestuff. Thus, for example, two or three fluorescent dyestuffs homogeneously distributed in the binder may be applied to the photo-semiconductor.

In some cases in which several fluorescent dyestuffs were used, it was found surprisingly, that for a given total thickness of the layer and a given total quantity of fluorescent dyestuff, an arrangement consisting of several thinner layers of binder each of which contained a single fluorescent dyestuff resulted in a much greater increase in the blue sensitivity. In this case, the fluorescent dyestuff which had the absorption maximum at the shortest wavelength was in the uppermost layer whereas the fluorescent dyestuff that had its absorption maximum at the longest wavelength was contained in the layer which was immediately on the semiconductor surface. In this multi-layered arrangement, several different organic and/or inorganic binders could be used. This possibility is an advantage especially when a particular binder is compatible with the fluorescent dyestuff but attacks the semiconductor surface or conversely a given binder is completely neutral in its reaction to the semiconductor surface but chemically attacks the fluorescent dyestuff. It is only the lowermost layer, i.e. the layer in direct contact with the semiconductor, which must be compatible both with the semiconductor surface and with a fluorescent dyestuff.

Organic binders which may be used include particularly colorless epoxy resins, polyester resins, silicone resins, alkyd resins, resins of polyisocyanates and polyhydroxy compounds, cellulose acetates, cellulose acetobutyrates and cellulose esters. Numerous other resins including so-called synthetic resins or lacquers may also be used.

Of the inorganic binders, the colorless, low melting glasses and enamel types are especially suitable.

If a multi-layered system of various binders is to be applied to the photo-semiconductor, it is advantageous to select the binders such that their refractive indices increase above downwards, i.e. in the direction towards the semiconductor surface, because less extensive scattering losses of the light entering the system of layers or of the fluorescent light produced in it then occur.

Good dispersion of the fluorescent dyestuff in the binder can be achieved, for example, with a ball mill. Care must be taken to ensure clean working conditions, e.g. balls and grinding vessels of agate or some other material having extremely low abrasion can be employed.

The multi-layered system may be built up, for example, by applying each layer freshly to the semiconductor after the preceding layer has hardened out, or alternatively individual layers may be formed separately, e.g. as foils, and then combined with the particular preceding layer, for example by employing the binder of the preceding layer as adhesive for the separate layer.

The spectral sensitivity of selenium and silicon and of the chalcogenides of zinc and cadmium may advantageously be improved by the method described. Of the chalcogenides, the sulfides, selenides and sulfoselenides are preferred.

The production and qualities of the new photoresistors and photoelements will now be explained more fully in the following examples.

Example 1

Photoresistors of cadmium sulfide having a zinc sulfide content of 2% and doped with $2.4 \times 10^{-4}\%$ copper and chlorine, in the form of sintered and pressed circular pellets with comb electrodes applied by evaporation to the upper surface are provided on their upper surface with a $2.5\mu$ thick layer of a colorless epoxy resin into which the following substances are mixed in homogeneous distribution, the quantities being calculated on the weight of resin:

| | Percent |
|---|---|
| 1-p'-sulfonamideo-phenyl-3-p-Cl-phenylpyrazoline | 0.20 |
| 2:2'-dihydroxy-α-naphthaldazine | 0.10 |
| 3:9-perylenedicarboxylic acid diisobutyl ester | 0.10 |

FIGURE 1 shows the relative spectral photocurrent of this cadmium sulfide photoresistor: Curve 1 without, Curve 2 with a layer of fluorescent substance.

Example 2

Photoresistors of cadmium sulfoselenide, consisting of 65% cadmium sulfide and 35% cadmium selenide and doped with $1.9 \times 10^{-4}\%$ copper and chlorine, in the form of sintered and pressed circular pellets having comb electrodes applied by evaporation to the upper surface, are provided on their upper surface with a $100\mu$ thick layer of a transparent silicone resin of low baking temperature into which the following substances are mixed in homogeneous distribution, the quantities being calculated on weight of resin:

| | Percent |
|---|---|
| 3 - phenyl - 7-[2'-Cl-4'-diethylamino-triazinyl-(6')]-coumarin | 0.20 |
| 1-phenyl-3-styrylpyrazoline | 0.07 |
| Anthrapyrimidine | 0.01 |

Figure 2:
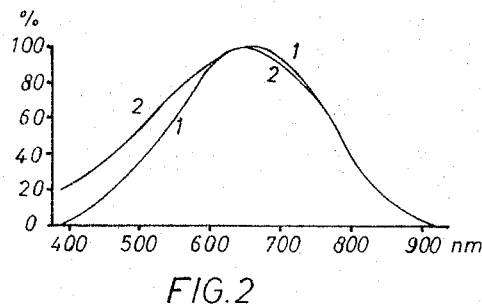
FIG. 2 is another graph showing the relative spectral photocurrent of a photoresistor in accordance with the invention.

FIGURE 2 shows the relative spectral photocurrent of the photo-resistors of cadmium sulfoselenide: Curve 1 without, Curve 2 with a layer of fluorescent substance.

Example 3

Photoresistors of cadmium selenide, doped with $1.2 \times 10^{-4}\%$ copper and chlorine, in the form of sintered and pressed circular pellets which have comb electrodes applied by evaporation to the upper surface, are provided on their upper surface with a three-layered system which is built up as follows:

(1) A $10\mu$ thick layer of a colorless, unsaturated polyester resin which contains, calculated on the weight of resin, 0.40% of 3[2''-Cl-4''-diethylamino-triazinyl-(6'')-aminophenyl] coumarin in molecular dispersion, is applied directly to that side of the sintered plate of cadmium selenide on which the electrode is situated.

(2) The second layer of the three-layered system is cast separately as a $15\mu$ thick foil from a highly esterified cellulose acetate which contains in molecular dispersion, calculated on the weight of resin, 0.20% of a condensation product of 1 mol of terephthalic aldehyde+2 mols of cyanoethyl acetate and 0.20% of 2:2'-dioxybenzaldazine-salicylaldazine. This foil is fixed to the still fresh first polyester resin layer, using the polyester resin as adhesive.

Figure 3:
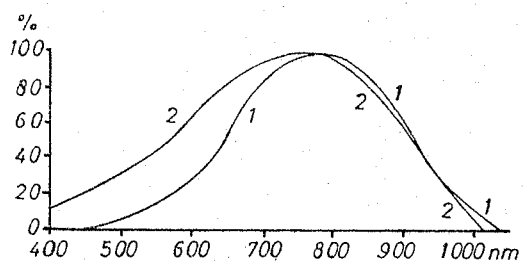
FIG. 3 is another graph showing the relative spectral photocurrent of a photoresistor in accordance with the invention.
Figure 6:
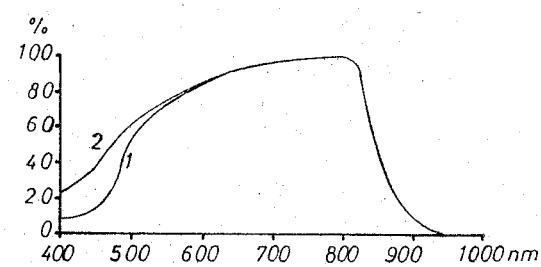
FIG. 6 is another graph showing the relative spectral photocurrent of a photoresistor in accordance with the invention.

(3) A $20\mu$ thick layer of a colorless lacquer composed of a polyisocyanate and a polyhydroxy compound and containing as a molecular dispersion 0.05% of a condensation product of 1 mol of perylene tetracarboxylic acid+2 mols of 4:5-dichloro-o-toluidine, calculated on the weight of lacquer, is applied to the foil. FIGURE 3 shows the relative spectral photocurrent of the photoresistors of cadmium selenide: Curve 1 without, Curve 2 with the three-layered system of fluorescent substances.

*Example 4*

A 30μ thick film of a colorless alkyd resin in which a brightening agent is uniformly dispersed is applied to the light sensitive layer of commercial selenium photoelements produced by the high vacuum evaporation process. Calculated on the weight of resin, the film contains 0.15% of 1-p'-sulfonamido-phenyl-3-p-Cl-phenylhydrazine.

Figure 4:
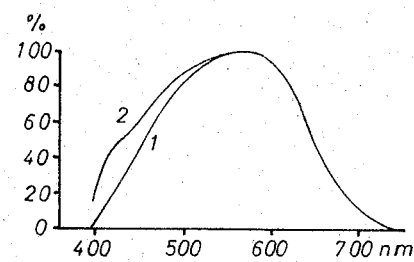
FIG. 4 is another graph showing the relative spectral photocurrent of a photoresistor in accordance with the invention.

FIGURE 4 shows the relative spectral photo-short-circuit-current of the selenium photoelements: Curve 1 without, Curve 2 with the layer of fluorescent substance.

*Example 5*

An approximately 30μ thick coating of a colorless enamel which has a particularly low softening point is applied in the molten state by the immersion process to the photosensitive layer of commercial single crystal photoelements of silicon. Homogeneously dissolved in the melt are 1.30% sodium salicylate and 0.08% 4-amino-1:8-napthal-p-xenylimide, calculated on the weight of enamel.

Figure 5:
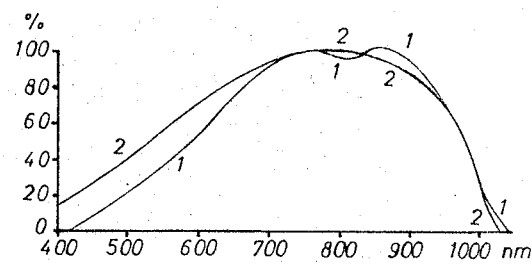
FIG. 5 is another graph showing the relative spectral photocurrent of a photoresistor in accordance with the invention.

FIGURE 5 shows the relative spectral photo-short-circuit-current of the photoelements of silicon: Curve 1 without, Curve 2 with the fluorescent glass coating.

*Example 6*

Cubic, n-conductive cadmium telluride single crystals prepared by melting together stoichiometric quantities of pure tellurium and pure cadmium and $1.0 \times 10^{-4}\%$ of indium in an evacuated quartz ampulla, are cut into slices which are polished and etched. These single crystal discs are coated with gold-layers of nearly semitransmittance by evaporation in high vacuum and immediately thereafter they are subjected to tempering, a p-n-transition being thereby produced in the surface. The p-conductive surface is then coated with a 20μ thick layer of an epoxy resin which contains, homogeneously distributed, 0.55% ethyl ester of meta-monoethylaminophenol-phthalein hydrochloride and 0.02% metadiethylaminophenol-phthalein hydrochloride, calculated on the weight of resin.

An approximately 100μ thick window of low melting glass which contains 0.04% of 9:10-dianilinoanthracene calculated on the weight of glass, is applied to the fresh, adhesive layer of epoxy resin.

We claim:

1. Photoconductive element with high sensitivity which comprises a semiconductive material being in optical contact with at least one layer of a colorless binder, said binder containing in homogeneous distribution 0.01 to 2% by weight of a dyestuff selected from the group consisting of sodium salicylate and 4 - amino - 1:8 - naphthal - p - xenylimide, 1 - p - sulfonamido - phenyl - 3 - p - Cl - phenylpyrazoline, 3-[2″ - Cl - 4″ - diethylamino - triazinyl - (6″) - aminophenyl] - coumarin, 3 - phenyl - 7 - [2' - Cl - 4' - diethylamino-triazinyl-(6')]-coumarin, a condensation product of 1 mol of terephthalic aldehyde+2 mols of cyanic ethyl ester, 4-amino-1:8-naphthal-p-xenylimide, 1-phenyl-3-styrylpyrazoline, 2:2'-dihydroxy-naphthaldazine, 2:2'-dioxybenzaldazine-salicylaldazine, the ethyl ester of meta-monoethylaminophenol-phthalein hydrochloride, anthrapyrimidine and the condensation products of 1 mol of perylene-tetracarboxylic acid+2 mols of 4:5-dichloro-orthotoluidine and meta-diethylaminophenol-phthalein hydrochloride.

2. Photoconductive element according to claim 1, in which photoconductive element the semiconductive material is selected from the group consisting of silicon, selenium, cadmium chalcogenides and zinc chalcogenides.

3. Photoconductive element according to claim 1, in which photoconductive element the colorless binder is selected from the group consisting of epoxy resins, polyester resins, silicone resins, alkyd resins, resins of polyisocyanates and polyhydroxy compounds, cellulose acetates, cellulose acetobutyrates and cellulose esters, low melting glasses and low melting enamels.

4. Photoconductive element with high sensitivity which comprises semiconductive material being in optical contact with 2 to 4 layers of a transparent binder containing at least one dyestuff selected from the group consisting of sodium salicylate and 4-amino-1:8-naphthal-p-xenylimide, 1 - p - sulfonamido - phenyl - 3 - p - Cl-phenyl - pyrazoline, 3 - [2″ - Cl - 4″ - diethylamino-triazinyl - (6″) - amino - phenyl] - coumarin, 3 - phenyl-7 - [2' - Cl - 4' - diethylamino - triazinyl - (6')] - coumarin, a condensation product of 1 mol of terephthalic aldehyde+2 mols of cyanic ethyl ester, 4-amino-1:8-naphthal - p - xenylimide, 1 - phenyl - 3 - styrylpyrazoline, 2:2' - dihydroxynaphthaldazine, 2:2' - dioxybenzaldazine-salicylaldazine, the ethyl ester of meta-monoethylaminophenol-phthalein hydrochloride, anthrapyrimidine and the condensation products of 1 mol of perylene-tetracarboxylic acid+2 mols of 4:5-dichloro-ortho-toluidine and meta-diethylaminophenol-phthalein hydrochloride, being distributed in each layer in a concentration of between 0.01 to 2% by weight, said layers being arranged according to their absorption maxima such that the layer with the wave absorption maxima is arranged directly on the photo-semiconductor material.

5. Photoconductive element with high sensitivity which comprises cadmium sulfide as semiconductive material being in optical contact with a layer of an epoxy resin, said epoxy resin containing in homogenous distribution 0.01 to 2% by weight of 1-p-sulfonamido-phenyl-3-p-Cl-phenylpyrazoline, 2:2'-dihydroxy-α-naphthaldazine and 3:9-perylene-dicarboxylic acid diisobutyl ester.

6. Photoconductive element with high sensitivity which comprises cadmium sulfoselenide being in optical contact with a layer of an epoxy resin, said epoxy resin containing in homogenous distribution 0.01 to 2% by weight of 1 - p - sulfonamido - phenyl - 3 - p - Cl - phenylpyrazoline, 2:2'-dihydroxy-α-naphthaldazine and 3:9-perylene-dicarboxylic acid diisobutyl ester.

References Cited by the Examiner

UNITED STATES PATENTS 3,160,520   12/1964   Jantsch et al. _____ 117—201

ALFRED L. LEAVITT, *Primary Examiner.*

WILLIAM L. JARVIS, *Examiner.*